United States Patent [19]

Schoch

[11] Patent Number: 4,538,707

[45] Date of Patent: Sep. 3, 1985

[54] TWO WHEEL RIM BRAKE WITH ROTATABLE ACTUATING ELEMENT

[75] Inventor: Robert Schoch, Hilzingen, Fed. Rep. of Germany

[73] Assignee: Weinmann GmbH & Co. KG, Singen, Fed. Rep. of Germany

[21] Appl. No.: 442,959

[22] Filed: Nov. 19, 1982

[30] Foreign Application Priority Data

Nov. 27, 1981 [DE] Fed. Rep. of Germany ....... 3147203
Sep. 9, 1982 [DE] Fed. Rep. of Germany ......... 323351

[51] Int. Cl.³ .............................................. B62L 1/10
[52] U.S. Cl. .................................. 188/24.22; 188/72.7
[58] Field of Search ............... 188/24.22, 24.11, 24.12, 188/24.13, 24.14, 24.15, 24.16, 24.17, 24.18, 24.19, 26, 72.9, 72.8, 250 F, 250 R, 17, 72.7, 2 D

[56] References Cited

U.S. PATENT DOCUMENTS 2,612,968 10/1952 Hood ..................................... 188/26
3,927,736 12/1975 Bergles ........................... 188/72.8 X
4,050,549 9/1977 Hori et al. ........................... 188/72.8

FOREIGN PATENT DOCUMENTS 0080630 6/1983 European Pat. Off. ......... 188/24.22
2655699 6/1978 Fed. Rep. of Germany .
381656 9/1907 France .
895049 5/1943 France .
0903456 10/1945 France .............................. 188/24.14
934750 10/1946 France .

Primary Examiner—Douglas C. Butler
Attorney, Agent, or Firm—Learman & McCulloch

[57] ABSTRACT

The invention relates to a rim brake for a bicycle or the like and in which the brake lining can be moved via a pivotally mounted actuating member and a support member which carries the brake lining and is movable at right angles to the rim. The actuating member is rotatable about an axis which may coincide with the axis of displacement of the support member and is connected to the support member via a threaded control such that rotation of the actuating member in one direction imparts axial movement of the support member in a direction to apply the brake lining to the rim.

9 Claims, 14 Drawing Figures

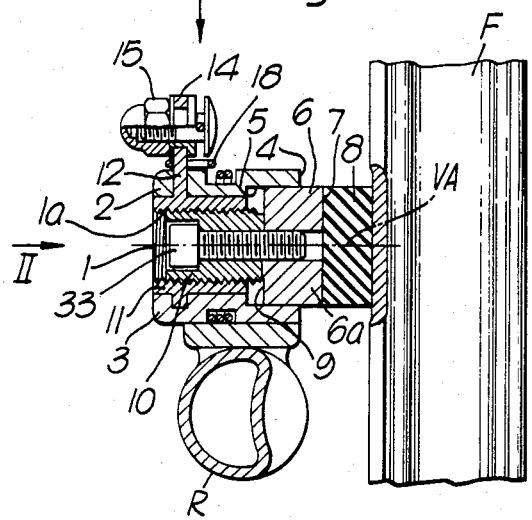

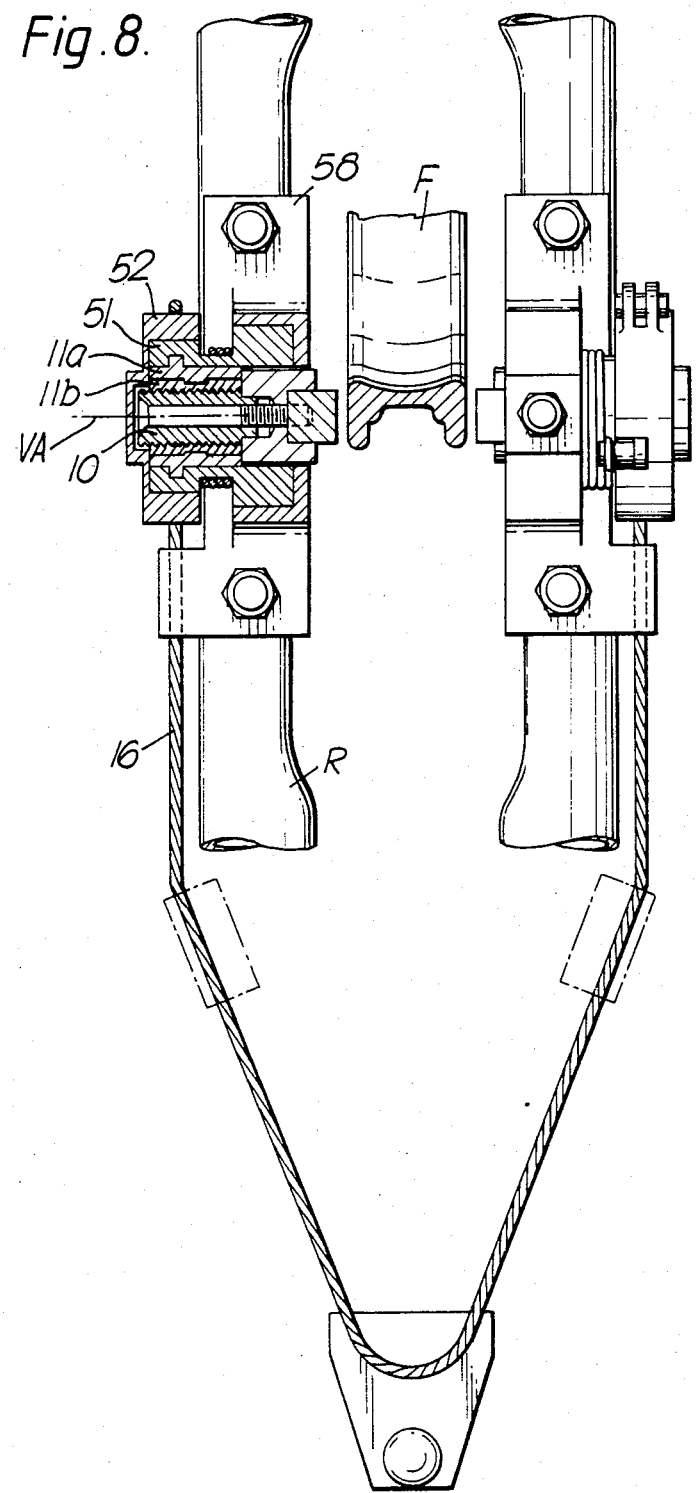

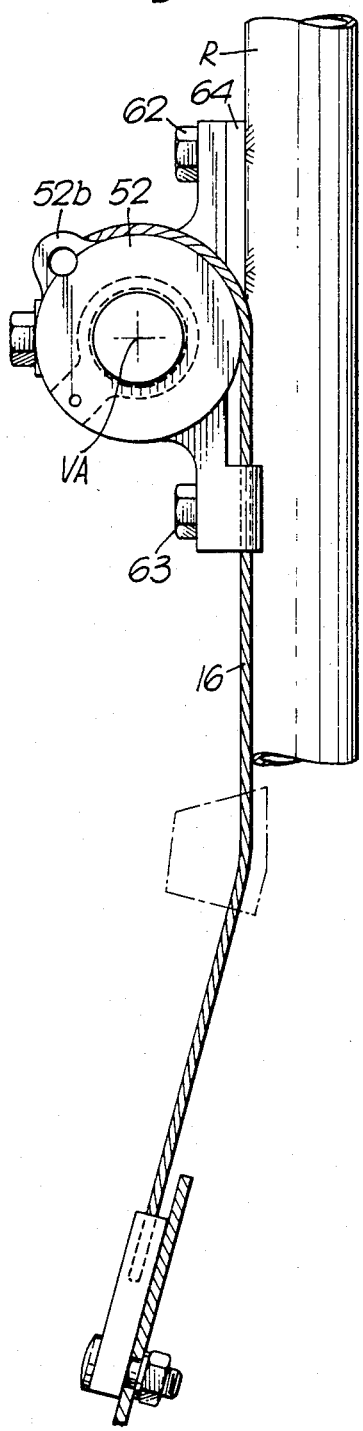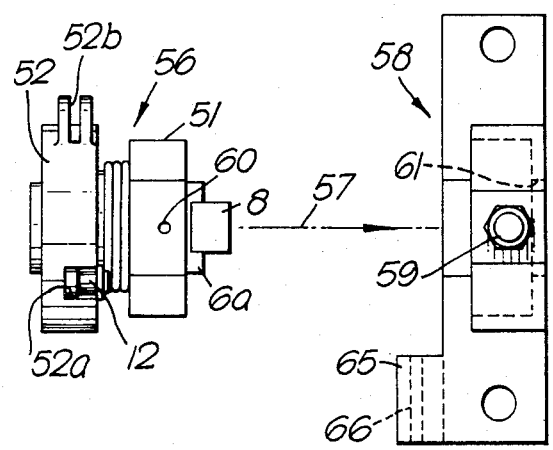

TWO WHEEL RIM BRAKE WITH ROTATABLE ACTUATING ELEMENT

BACKGROUND OF THE INVENTION

The invention relates to a two wheel rim brake, especially for bicycles, in which each brake lining can be moved inwards by means of a pivotally mounted actuating member which can be actuated by a cable and a sliding member which carries the brake lining and can be moved in a straight line at right angles to the rim so that the brake lining rests on the rim and can move back outwards by spring action.

Rim brakes are known using brake levers pivotable about a common axis running in the longitudinal direction of the bicycle. The stability of such rim brakes and their braking effect when wet leave much to be desired.

A known two wheel rim brake is disclosed in German Auslegeschrift No. 26 55 699 in which brake linings carried by sliding members can be moved in a straight line and can be actuated by angle levers which are pivotable about an axis which runs at right angles to the axis of displacement of the sliding member. These rim brakes do have a greater stability than the constructions referred to above, but they have the disadvantage that they require a relatively large amount of space (in the direction at right angles to the rim).

SUMMARY OF THE INVENTION

The object of the invention is to provide a two wheel rim brake which is distinguished by a stable and space-saving construction, sensitive actuation which is easy and effective in all weathers, and a design which is simple to manufacture and assemble.

This object is achieved in that the actuating member is pivotable about an axis which coincides with the axis of displacement of the sliding member, or is parallel thereto, and is connected to the sliding member by means of a control surface which is inclined relative to such axis.

In the construction according to the invention the effective brake parts, especially the sliding members with the brake linings and the actuating levers, are held directly on the bicycle frame or forked tube sections immediately opposite the rim. The actuating lever is thus located in the immediate proximity of the sliding member, which results in an extremely compact construction, in particular at right angles to the rim. The rim brake according to the invention is distinguished by extraordinary stability and by particularly sensitive actuation of the brake which is highly effective in all weathers.

DESCRIPTION OF THE DRAWINGS

Advantageous embodiments of the invention are explained in greater detail hereinafter and are illustrated in the accompanying drawings, wherein:

FIG. 1 is a section through a first embodiment of the rim brake according to the invention;

FIG. 2 is a side view in the direction of the arrow II in FIG. 1;

FIG. 3 is a view in the direction of the arrow III in FIG. 1;

FIGS. 8 and 9 are a plan view and a side view, respectively, of a fourth embodiment of the invention;

FIG. 10 is a schematic view illustrating the assembly of the rim brake according to FIGS. 8 and 9;

DETAILED DESCRIPTION

Figure 4:
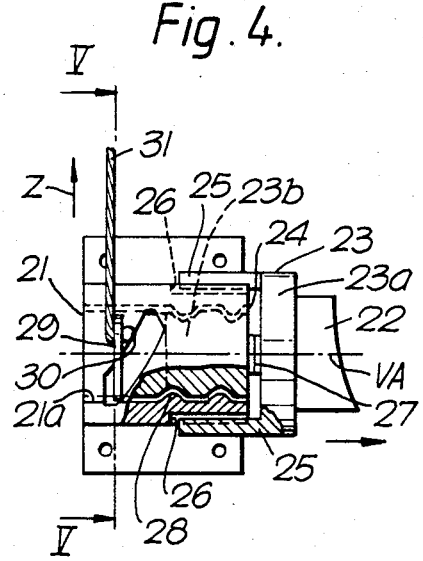
FIG. 4 is a partially cut-away view of a second embodiment.

In the first embodiment illustrated in FIGS. 1-3, a bearing housing 1 is mounted on a tube frame section R opposite the wheel rim F. The tube section R can be either an arm of the fork for the front wheel or a corresponding frame tube section in which the rear wheel of a bicycle is located. Only the left-hand half of the rim brake is illustrated, but it should be understood that a corresponding brake half is provided on the right-hand side of the rim F.

The bearing housing 1 contains an upper and a lower housing section 2 and 3, respectively, which are connected to each other by means of screws 19. The bearing housing 1 is fixed by means of screws 20 to a plate 32 which is welded to the tube section R.

On the end face 4 facing the rim F, the bearing housing 1 has a recess 5 in which a sliding member 6 can be moved in a straight line along an axis of displacement VA at right angles to the rim. That end face 7 of the sliding member 6 facing towards the rim F bears a brake lining 8 which is firmly, but removably, connected to the sliding member 6 in known manner.

The sliding member 6 is constructed in two parts. A first part 6a bears the brake lining 8 and is capable of sliding movement in the direction of the axis of displacement VA inside the recess 5 in the bearing housing 1, but is mounted so that it is not rotatable. For this purpose the first part 6a of the sliding member 6 has a cross-section which is not circular, and is preferably square. The cross-section of the recess 5 is adapted to that of the part 6a of the sliding member.

The second part of the sliding member 6 is formed by a threaded spindle 10 with a relatively large pitch. This is axially connected directly onto the end face 9 of the first part 6a of the sliding member facing away from the rim F and is connected to this part 6a by means of a serration and a screw 33 so as to be fixed against rotation and displacement. The external thread of the threaded spindle 10 engages with the internal thread of a threaded bush 11, the outer periphery of which is essentially cylindrical and rotatably mounted in a cylindrical internal bore 1a in the bearing housing 1.

On its outer periphery the threaded bush 11 has a radially extending actuating member 12 accommodated in a guide slot 13 provided in the upper housing section 2. This guide slot 13 defines the possible pivotal movement of the actuating lever 12 in the direction of the two-headed arrow 12 a. The cable 16 of a Bowden wire 17 is clamped onto the outer end 14 of the actuating lever 12 by means of a rotatably mounted screw connection 15. A helical spring 18, one end of which engages on the actuating lever 12 and the other end of which is secured to the bearing housing 1, is provided on the outer periphery of the bearing housing 1.

When the rim brake is actuated the cable 16 is pulled in the direction of the arrow Z. In this way the actuating lever 12 is pivoted against the force of the helical spring 18. Consequently the threaded bush 11 connected to the actuating member 12 is rotated in the bore 1a in the bearing housing 1. Since the guide slot 13 for the actuating lever 12 lies in a plane at right angles to the axis of displacement VA, during this rotary movement the threaded bush 11 cannot move axially inside the bore 1a in the bearing housing 1. The threads of the threaded bush 11 and the threaded spindle 10 engage with each other and produce a control surface running at an angle to the pivot axis of the actuating lever 12. Consequently rotation of the threaded bush 11 results in rectilinear displacement of the threaded spindle 10 and thus also of the part 6a of the sliding member and the brake lining 8 borne thereon. Consequently the brake lining 8 comes to rest on the rim F.

When the cable 16 is released the tensioned helical spring 18 turns the actuating lever 12 back in the clockwise direction (FIG. 2). The rotary movement of the threaded bush 11 thus results in an axial movement of the threaded spindle 10 and movement of the brake lining 8 away from the rim F.

Figure 5:
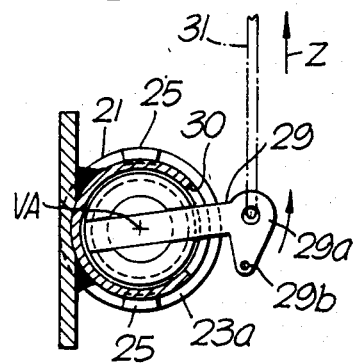
FIG. 5 is a section along the line V—V in FIG. 4.

In the embodiment according to FIGS. 4 and 5, the brake lining 22 is borne by the first part 23a of a sliding member 23 which can move in a straight line at right angles to the rim. The first part 23a of the sliding member is arranged substantially in front of the end face 24 of the housing outside the bearing housing 21 and is provided in the ion of its outer periphery with axial guide lugs 25 which face away from the brake lining 22 and are each guided in an axial guide groove 26 in the outer periphery of the bearing housing 21. Thus the first part 23a of the sliding member is not rotatable but is guided in the bearing housing 21 so as to be axially movable.

The second part 23b of the sliding member 23 which is located inside the housing is connected to the first part 23a by a connecting pin 27 so that it is fixed against displacement but is rotatable. The second part 23b of the sliding member can also be constructed in this embodiment in the form of a threaded spindle which has an external thread with a large pitch.

In contrast to the embodiment according to FIGS. 1-3, in the variant according to FIGS. 4 and 5 no separate threaded bush is provided in the bearing housing 21. The cylindrical inner wall 21a of the bearing housing 21 has an internal thread which connects with the external thread of the part 23 of the sliding member.

The part 23b of the sliding member constructed as a threaded spindle carries an actuating member 29 which projects radially outwards through a guide slot 30 provided in the bearing housing 21 and is connected at its outer end 29a to the Bowden cable 31. In this embodiment the guide slot 30 has a helix which is adapted to the internal thread 28 and the part 23b of the sliding member.

If the actuating lever 29 is moved by the cable 31 in the direction of the arrow Z then the part 23b of the sliding member rotates in the internal thread 28 of the bearing housing 21 and at the same time moves along the axis VA so that the brake lining 22 is pressed onto the rim. The return movement is produced by a spring (not shown) which can react for example between the small hole 29b in the actuating lever 29 and a convenient part of the housing 21.

Figure 6:
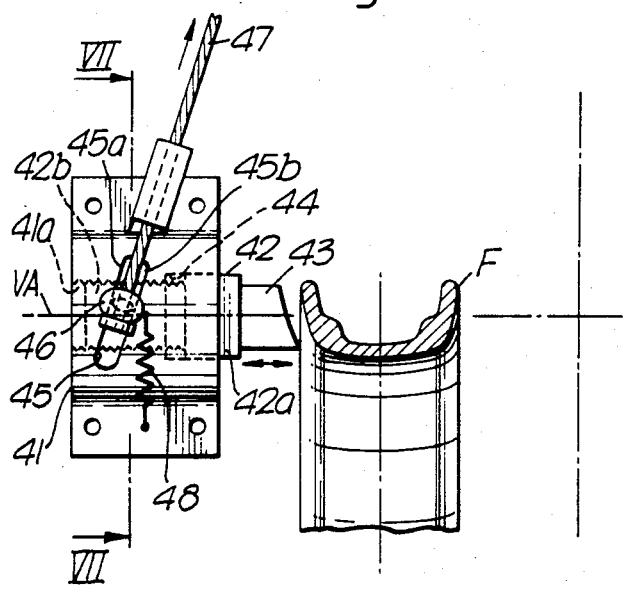
FIG. 6 is a view of a third embodiment.
Figure 7:
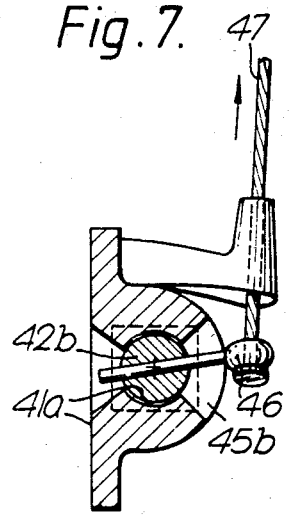
FIG. 7 is a section along the line VII—VII in FIG. 6.
Figure 11:
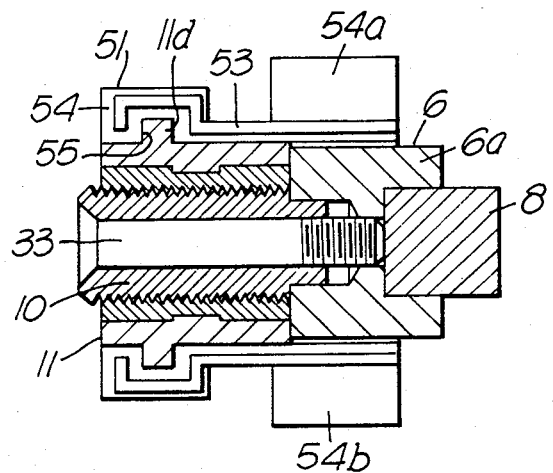
FIG. 11 is a section (on an enlarged scale) through the essential parts of the rim brake according to FIGS. 8 and 9.
Figure 12:
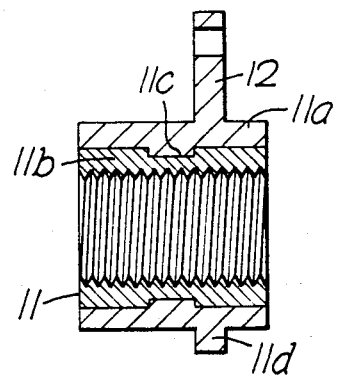
FIGS. 12 and 13 are a longitudinal section and end view, respectively, of the threaded bush of the embodiment of FIGS. 8–11.

In the third embodiment shown in FIGS. 6 and 7, a sliding member 42 is movable in a straight line in a bearing housing 41 and the first part 42a of the sliding member facing the rim F bears a brake lining 43. This first part 42a of the sliding member is guided in a corresponding recess 44 in the housing so as to be slidably movable but not rotatable. The second part 42b of the sliding member is connected to the first part 42a so as to be fixed against displacement but rotatable relative thereto. The second part 42b of the sliding member is constructed as a cylindrical pin which is mounted in a cylindrical bore 41a in the bearing housing 41. The bearing housing 41 has a guide slot 45 through which an actuating lever 46 which is connected to the second part 42b of the sliding member so as to be fixed against rotation extends radially outwards. The guide slot 45 extends helically and with its radial longitudinal faces 45a, 45b forms the control surface for the actuating lever 46 and the sliding member 42.

The actuating lever 46 is constructed as a pin and passed through a bore in the second part 42b of the sliding member. The outer end of the actuating lever 46 is connected to a Bowden cable 47. A retracting spring 48 ensures the return of the actuating lever 46 and the sliding member 42 to the starting position after release of the cable 47.

A further preferred embodiment of the invention is illustrated in FIGS. 8-13. These show a variant of the embodiment according to FIGS. 1 to 3. Insofar as the parts identical the same reference numerals are used as in FIGS. 1-3. Accordingly, only those features of the embodiment according to FIGS. 8-13 which differ from the arrangement according to FIGS. 1-3 are explained in detail.

The threaded bush 11, which in the embodiment according to FIGS. 1-3 is constructed in one piece as a metal part, consists in the variant according to FIGS. 8-13 of an outer metal part 11a (which is preferably produced as an extrusion molded part made from steel or nonferrous metal) which forms actuating lever 12 and an injection molded inner threaded part 11b made from plastics material.

Whereas a metal thread with a very large pitch can only be mass produced at relatively high cost, an injection molded plastic thread can be produced very economically (the outer metal part is advantageously provided with one or more radial bores for injection of the plastics material). The injection molded plastic thread has very good antifriction properties (less friction than steel on steel) and does not require any lubrication, which means that the rim brake requires little maintenance.

Figure 13:
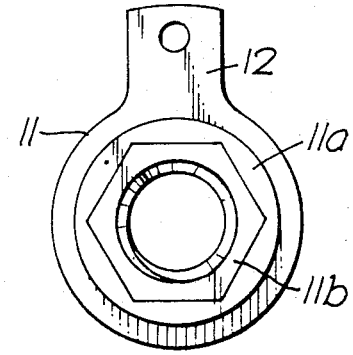

As can be seen in particular in FIG. 13, the outer metal part 11a of the threaded bush 11 has a polygonal internal cross-section (hexagonal) which serves to receive the plastic thread part 11b so as to be fixed against rotation. In order to secure the plastic thread part 11b in the axial direction, a collar 11c which projects radially inwards is provided on the outer part 11a.

In contrast to the embodiment according to FIGS. 1-3, in the arrangement according to FIGS. 8-13 the actuating member 12 is also connected to a cylindrical intermediate member which is rotatably mounted on the bearing housing 51 and is constructed in the form of an outer cover plate 52 for the bearing housing. This cover plate 52 has a recess 52a in which the actuating member 12 fits. The cover plate 52 also has a forked carrier 52b on which the cable 16 engages. As can be seen in particular from FIG. 9, the cable 16 is passed over a part of the cylindrical periphery of the cover plate 52 and connected to the latter at such a point on the periphery (in the carrier 52b) that during the whole actuating movement the lever member remains constantly between its connection point to the carrier 52b and the axis of rotation, i.e., the axis of displacement VA. The constancy of the lever transmission thus provided during the whole actuating movement facilitates sensitive actuation of the brake requiring little force. The cover plate 52, which thus forms the intermediate member between the cable 16 and the actuating lever 12, at the same time constitutes an outer cover for the brake which prevents dirt from penetrating the brake unit.

The construction of the bearing housing 51 in the embodiment according to FIGS. 8–13 differs from that of the first embodiment. It contains an insert 53 made from sheet steel which is covered with plastic 54. The plastic part facing the rim is advantageously constructed in the form of two half shells 54a, 54b. This construction of the bearing housing 51 as a composite part made from metal and plastic ensures the necessary strength and stability with very economic production.

The inner periphery of the bearing housing 51 is provided with an annular groove 55 in which a radially projecting collar 11d of the metal outer part 11a of the threaded bush 11 is received. This ensures the necessary axial securing against displacement of the threaded bush 11 in the bearing housing 51.

As can be seen in particular from FIG. 10, the whole assembly 56 consisting of the bearing housing 51 (with all the parts accommodated therein) and the cover plate 52 can be pushed in the direction of the arrow 57 (i.e., at right angles to the rim) into a housing fixture 58 mounted on the bicycle and can be retained in this fixture by means of a screw 59, the tip of which fits into a recess 60 on the periphery of the bearing housing 51. For this purpose the housing fixture 58 is provided with an opening 61 through which the part 6a of the sliding member bearing the brake lining 8 passes and is secured against rotation.

The housing fixture 58 can be fastened by means of screws 62, 63 on a plate 64 which is welded to the tube section R. The housing fixture 58 also has a projection 65 in which a guide groove 66 for the cable 16 is provided. In this way the cable 16 is passed reliably along the periphery of the cover plate 52 and secured against lateral slipping.

If a tube section of the bicycle is constructed in a form corresponding to the housing fixture 58, i.e., is provided with an opening suitable for insertion of the assembly 56, then a separate housing fixture 58 can be dispensed with. The brake according to the invention can therefore be mounted very easily and simply as a unit, for example in a front wheel fork of a bicycle provided with a corresponding recess.

Although in the embodiments discribed the axis of displacement VA of the sliding member at the same time constitutes the pivot axis for the actuating lever, constructions are also possible within the scope of the invention in which these two axes are parallel to each other.

As far as the thread pitch of the control surface is concerned, on the one hand this is chosen to be large enough for the desired rapidity of the braking movement to be ensured, but on the other hand only large enough for sensitive actuation of the brake to be possible without jamming. The screw thread can be constructed with a single or multiple thread. With a single thread it is generally advantageous to have a greater depth of thread with correspondingly stable flanks, whereas with a multiple screw thread a reduced depth of thread with less strong flanks is sufficient.

The rim brake according to the invention can be mounted both on the arms of the front wheel fork of a bicycle and on the corresponding tube sections of the frame for the rear wheel. An especially preferred location for arrangement of the brake parts for the rear wheel is the U-shaped frame portion which is located immediately behind the pedal bearing and is formed like a fork around the rear wheel. This arrangement of the rear wheel brake parts permits the same arrangement and cable guiding for women's and men's bicycles. This mounting point is also particularly favored by the particularly stable construction of this part of the frame.

Figure 14:
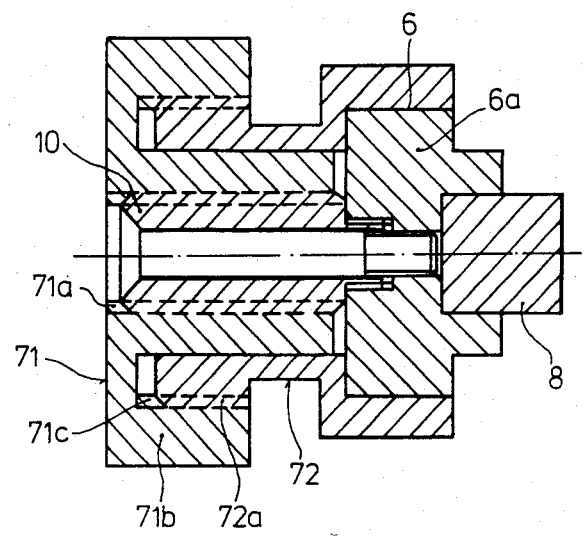
FIG. 14 is a section through a fifth embodiment.

FIG. 14 shows a fifth embodiment which is a further improvement of the embodiment of FIGS. 8–13. A bush 71 having an internal thread 71a accommodates a threaded spindle 10 and is provided with a collar 71b surrounding a bearing housing 72. Collar 71b has an internal thread 71c in engagement with an external thread 72a of the bearing housing 72. The pitch of the internal thread 71c of collar 71b is substantially less than the pitch of the thread 71a which engages the spindle 10.

The threaded bush 71 is connected to the cable 16 (not shown) in the same manner as the cover plate 52 of embodiment FIGS. 8–13 is connected with the cable 16. The threaded bush 71, therefore, is the actuating member connected with the cable and effects the axial movement of the sliding member 6.

A small axial movement of the threaded bush 71 relative to the stationary bearing housing 72 is effected when the threaded bush 71 is rotated by the cable. As the pitch of thread 71a, however, is much greater than the pitch of thread 71c, the threaded spindle 10 is axially moved by this rotation of the threaded bush 71 so that the brake lining 8 contacts the rim. A self-locking effect is obtained between threads 71c, 72a which has the advantage that the driver has to exert only a small force when braking (only a force has to be used sufficient to counteract the force of the spring, whereas the main part of the braking force is counteracted by the self-locking between threads 71c, 72a).

A further advantage of the embodiment of FIG. 14 is the very simple construction. The threaded bush 71 can be produced in one piece from plastic material. The same observation applies to the bearing housing 72.

What is claimed is:

1. A brake for use with a wheel rim of a wheeled cycle, said brake comprising a pair of housings; means for mounting said housings on opposite sides of and adjacent said rim; a support slideably but non-rotatably mounted in each of said housings for sliding movements along an axis of displacement in directions toward and away from said rim; a brake lining carried by each of said supports in a position to engage said rim; a threaded spindle connected to each of said supports for sliding movements therewith; a threaded bush mounted in each of said housings for rotation about said axis and in threaded engagement with the associated spindle; actuating means coupled to each of said bushes for rotating the latter simultaneously; and means reacting between each of said housings and the associated actuating means for preventing movement of the latter longitudinally of said axis, whereby rotation of said bushes effects sliding movements of said supports along said axis.

2. The construction according to claim 1 wherein each of said actuating means includes a cylindrical part having a radially extending arm to which an operating cable may be attached at a point, and wherein the moment arm between the associated point and said axis of rotation is constant.

3. The construction according to claim 2 wherein each of said cylindrical parts forms an outer cover for the associated housing.

4. The construction according to claim 3 wherein each of said housings contains an insert formed of metal coated with a plastic material, each of said inserts having a groove in which a radially extending collar of the associated actuating means is accommodated.

5. The construction according to claim 1 including a collar encircling each of said housings, each of said housings and the associated collar having first engaged threads and each of said collars and the associated support haing second engaged threads, said first engaged threads having a lesser pitch than that of said second engaged threads.

6. The construction according to claim 1 including spring means coupled to each of said actuating means for biasing the latter to rotate in one direction.

7. The construction according to claim 1 wherein each of said actuating means comprises a lever arm extending through an opening in the associated housing.

8. The construction according to claim 1 wherein each of said actuating means comprises a cylinder in threaded engagement with the associated housing and in threaded engagement with the associated spindle.

9. The construction according to claim 8 wherein the threaded engagement between each of said cylinders and the associated housing and the threaded engagement between each of said cylinders and the associated spindle employ threads of different pitch.

* * * * *